US010281696B2

(12) United States Patent
Amano

(10) Patent No.: US 10,281,696 B2
(45) Date of Patent: May 7, 2019

(54) ZOOM LENS, PROJECTION DISPLAY DEVICE, AND IMAGING APPARATUS

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/687,860

(22) Filed: Aug. 28, 2017

(65) Prior Publication Data

US 2018/0059394 A1 Mar. 1, 2018

(30) Foreign Application Priority Data

Aug. 30, 2016 (JP) ................................. 2016-168098

(51) Int. Cl.
*G02B 15/167* (2006.01)
*G02B 13/16* (2006.01)
*G02B 15/163* (2006.01)

(52) U.S. Cl.
CPC ........... *G02B 15/167* (2013.01); *G02B 13/16* (2013.01); *G02B 15/163* (2013.01)

(58) Field of Classification Search
CPC .. G02B 15/167; G02B 15/163; G02B 15/177; G02B 15/20; G02B 13/009; G02B 13/16; G02B 13/18; G02B 13/22; G03B 21/142
USPC ................................. 359/432, 649, 679, 755
See application file for complete search history.

(56) References Cited

U.S. PATENT DOCUMENTS

| | | | | |
|---|---|---|---|---|
| 2009/0207502 A1* | 8/2009 | Cho | ..................... | G02B 15/177 359/689 |
| 2014/0036142 A1* | 2/2014 | Inoko | ....................... | G02B 3/00 348/369 |
| 2014/0204351 A1* | 7/2014 | Matsuo | .................. | G02B 13/16 353/98 |
| 2014/0268073 A1* | 9/2014 | Takano | .............. | G02B 13/0065 353/99 |
| 2014/0340658 A1* | 11/2014 | Takano | .................. | G03B 21/28 353/99 |
| 2014/0347740 A1* | 11/2014 | Nagatoshi | ............ | G02B 15/167 359/663 |
| 2015/0070778 A1* | 3/2015 | Amano | .................. | G02B 13/22 359/663 |
| 2015/0234167 A1* | 8/2015 | Ode | ....................... | G02B 13/16 359/432 |

(Continued)

FOREIGN PATENT DOCUMENTS

JP 2015-152890 A 8/2015

*Primary Examiner* — Frank G Font
(74) *Attorney, Agent, or Firm* — Studebaker & Brackett PC

(57) ABSTRACT

The zoom lens includes: a first optical system on a magnification side; and a second optical system on a reduction side in a state where the intermediate image is formed between the magnification side and the reduction side. The first optical system includes, in order from the magnification side, a first-1 lens group which has a positive power, and a first-2 lens group which has a positive power. The second optical system includes, in order from the magnification side, a second-1 lens group which has a positive power, a second-2 lens group which has a positive power, and a second-3 lens group which has a positive power. The first-2 lens group, the second-1 lens group, and the second-2 lens group move during zooming. The first-1 lens group and the second-3 lens group remain stationary during zooming.

16 Claims, 10 Drawing Sheets

(56) References Cited

U.S. PATENT DOCUMENTS

2015/0293434 A1* 10/2015 Matsuo ................. G02B 13/16 353/101
2016/0223888 A1* 8/2016 Nishikawa ............. G02B 13/16

* cited by examiner

EXAMPLE 1

ZOOM LENS, PROJECTION DISPLAY DEVICE, AND IMAGING APPARATUS

CROSS REFERENCE TO RELATED APPLICATIONS

The present application claims priority under 35 U.S.C. § 119 to Japanese Patent Application No. 2016-168098 filed on Aug. 30, 2016. The above application is hereby expressly incorporated by reference, in its entirety, into the present application.

BACKGROUND OF THE INVENTION

1. Field of the Invention

The present invention relates to a zoom lens forming an intermediate image, a projection display device comprising the zoom lens, and an imaging apparatus comprising the zoom lens.

2. Description of the Related Art

In the past, projection display devices, each of which uses a light valve such as a liquid crystal display element or a Digital Micromirror Device (DMD: registered trademark) display element, have come into widespread use. In particular, some widely used devices adopt a configuration in which three light valves are used, illumination light beams with three primary colors of red, green, and blue respectively correspond to the light valves, synthesizes the light beams, which are modulated through the respective light valves, through a prism or the like, and displays an image onto a screen through a zoom lens.

In such a zoom lens used in a type of the projection display device that synthesizes the light beams modulated through the three light valves through a color synthesis optical system and projects the light beams, as described above, in order for a prism or the like for performing color synthesis to be disposed therein and in order to avoid a thermal problem, a long back focal length is necessary. Further, since spectral characteristics of the color synthesizing prism change depending on an angle of incident light, it is necessary for the projection lens to have the characteristic that the entrance pupil is at a sufficiently far position in a case where the reduction side is set as the incident side, that is, to be telecentric on the reduction side.

It has become necessary for such a type of the zoom lens to perform favorable aberration correction appropriate for the resolutions of light valves. Further, from the viewpoint of installability, in order to cope with the demands to have a high zoom ratio function and to perform projection onto a large screen at a short distance, it is necessary for a zoom lens to have a wider angle of view.

A zoom lens, which forms an intermediate image at a position conjugate to the reduction side imaging plane and forms the intermediate image again on the magnification side imaging plane, has been proposed so as to cope with such demands (for example, JP2015-152890A).

SUMMARY OF THE INVENTION

In a normal zoom lens of a system which does not form an intermediate image, in a case where an increase in angle of view is intended to be achieved by shortening a focal length thereof, the size of the magnification side lens inevitably becomes excessively large. However, in a zoom lens of a system which forms an intermediate image as described above, it is possible to shorten a back focal length of the lens system closer to the magnification side than the intermediate image. Therefore, it is possible to decrease a magnification side lens diameter of the lens system closer to the magnification side than the intermediate image, and this configuration is appropriate for achieving an increase in angle of view by shortening a focal length thereof. However, fluctuation in aberrations becomes large during zooming, and thus a problem arises in that it is difficult to keep optical performance high in the entire zooming range.

In the lens system described in JP2015-152890A, there is also a problem that fluctuation in aberrations is still large, and the zoom ratio is also as low as about 1.3 times.

The present invention has been made in consideration of the above-mentioned situation, and its object is to provide a zoom lens of a system that forms an intermediate image and has high performance by satisfactorily suppressing fluctuation in aberrations during zooming while achieving a wide angle and a high zoom ratio, a projection display device comprising the zoom lens, and an imaging apparatus comprising the zoom lens.

A zoom lens of the present invention forms an intermediate image at a position conjugate to a reduction side imaging plane and forms the intermediate image again on a magnification side imaging plane. The zoom lens comprises: a first optical system on the magnification side; and a second optical system on the reduction side. The intermediate image is formed between the magnification side and the reduction side. The first optical system includes, in order from the magnification side, a first-1 lens group which has a positive refractive power, and a first-2 lens group which has a positive refractive power. The second optical system includes, in order from the magnification side, a second-1 lens group which has a positive refractive power, a second-2 lens group which has a positive refractive power, and a second-3 lens group which has a positive refractive power. The first-2 lens group, the second-1 lens group, and the second-2 lens group are moved by changing spacings between the groups adjacent to each other in a direction of an optical axis during zooming. In addition, the first-1 lens group and the second-3 lens group remain stationary with respect to the reduction side imaging plane during zooming.

It is preferable that the zoom lens of the present invention satisfies the following conditional expression (1), and it is more preferable that the zoom lens satisfies the following conditional expression (1-1).

$$5 < f12/|fw| < 20 \quad (1)$$

$$7 < f12/|fw| < 15 \quad (1\text{-}1)$$

Here, f12 is a focal length of the first-2 lens group, and fw is a focal length of the whole system at a wide-angle end.

It is preferable that the zoom lens satisfies the following conditional expression (2), and it is more preferable that the zoom lens satisfies the following conditional expression (2-1).

$$5 < f22/|fw| < 12 \quad (2)$$

$$7 < f22/|fw| < 10 \quad (2\text{-}1)$$

Here, f22 is a focal length of the second-2 lens group, and fw is a focal length of the whole system at the wide-angle end.

It is preferable that the zoom lens satisfies the following conditional expression (3), and it is more preferable that the zoom lens satisfies the following conditional expression (3-1).

$$5 < f23/|fw| < 12 \quad (3)$$

$$6.8 < f23/|fw| < 10 \quad (3\text{-}1)$$

Here, f23 is a focal length of the second-3 lens group, and fw is a focal length of the whole system at the wide-angle end.

It is preferable that, during zooming from the wide-angle end to a telephoto end, the second-1 lens group moves from the magnification side to the reduction side, and the second-2 lens group moves from the reduction side to the magnification side.

It is preferable that the zoom lens satisfies the following conditional expression (4), and it is more preferable that the zoom lens satisfies the following conditional expression (4-1).

$$-25 < f211/|fw| < -2 \quad (4)$$

$$-20 < f211/|fw| < -3 \quad (4\text{-}1)$$

Here, f211 is a focal length of a lens closest to the magnification side in the second-1 lens group, and
fw is a focal length of the whole system at the wide-angle end.

It is preferable that the lens closest to the magnification side in the second-1 lens group is a second-1-1 lens which has a negative refractive power, a lens adjacent to the reduction side of the second-1-1 lens is a second-1-2 lens which has a positive refractive power, and the zoom lens satisfies the following conditional expression (5). In addition, it is more preferable that the zoom lens satisfies the following conditional expression (5-1).

$$30 < v211 - v212 < 70 \quad (5)$$

$$34 < v211 - v212 < 60 \quad (5\text{-}1)$$

Here, v211 is an Abbe number of the second-1-1 lens on the basis of the d line, and
v212 is an Abbe number of the second-1-2 lens on the basis of the d line.

It is preferable that the zoom lens satisfies the following conditional expression (6), and it is more preferable that the zoom lens satisfies the following conditional expression (6-1).

$$2 < Bfw/|fw| \quad (6)$$

$$3 < Bfw/|fw| < 10 \quad (6\text{-}1)$$

Here, Bfw is a back focal length of the whole system as an air conversion length at the wide-angle end, and
fw is a focal length of the whole system at the wide-angle end.

A projection display device of the present invention comprises: a light source; a light valve into which light originating from the light source is incident; and the zoom lens of the present invention, the zoom lens projecting an optical image, which is formed by light modulated through the light valve, onto a screen.

An imaging apparatus of the present invention comprises the above-mentioned zoom lens of the present invention.

It should be noted that the "magnification side" means a projected side (screen side). Even in a case where projection is performed in a reduced manner, for convenience, the screen side is referred to as the magnification side. On the other hand, the "reduction side" means an image display element side (light valve side). Even in a case where projection is performed in a reduced manner, for convenience, the light valve side is referred to as the reduction side.

Further, the "comprises . . . or includes . . ." means that the zoom lens may include not only the above-mentioned elements but also lenses substantially having no powers, optical elements, which are not lenses, such as a mirror having no power, a stop, a mask, a cover glass, a filter, and the like.

Further, the "lens group" is not necessarily formed of a plurality of lenses, but may be formed of only one lens.

Further, regarding the "back focal length", the following assumption is considered: the magnification side and the reduction side respectively correspond to the object side and the image side of a general imaging lens, and the magnification side and the reduction side are respectively referred to as the front side and the back side.

According to the present invention, the zoom lens forms an intermediate image at the position conjugate to the reduction side imaging plane and forms the intermediate image again on the magnification side imaging plane. The zoom lens comprises: the first optical system on the magnification side; and the second optical system on the reduction side. The intermediate image is formed between the magnification side and the reduction side. The first optical system includes, in order from the magnification side, the first-1 lens group which has a positive refractive power, and the first-2 lens group which has a positive refractive power. The second optical system includes, in order from the magnification side, the second-1 lens group which has a positive refractive power, the second-2 lens group which has a positive refractive power, and the second-3 lens group which has a positive refractive power. The first-2 lens group, the second-1 lens group, and the second-2 lens group are moved by changing spacings between the groups adjacent to each other in the direction of an optical axis during zooming. In addition, the first-1 lens group and the second-3 lens group remain stationary with respect to the reduction side imaging plane during zooming. Therefore, it is possible to provide a zoom lens that has high performance by satisfactorily suppressing fluctuation in aberrations during zooming while achieving a wide angle and a high zoom ratio, a projection display device comprising the zoom lens, and an imaging apparatus comprising the zoom lens.

DESCRIPTION OF THE PREFERRED EMBODIMENTS

Figure 1:
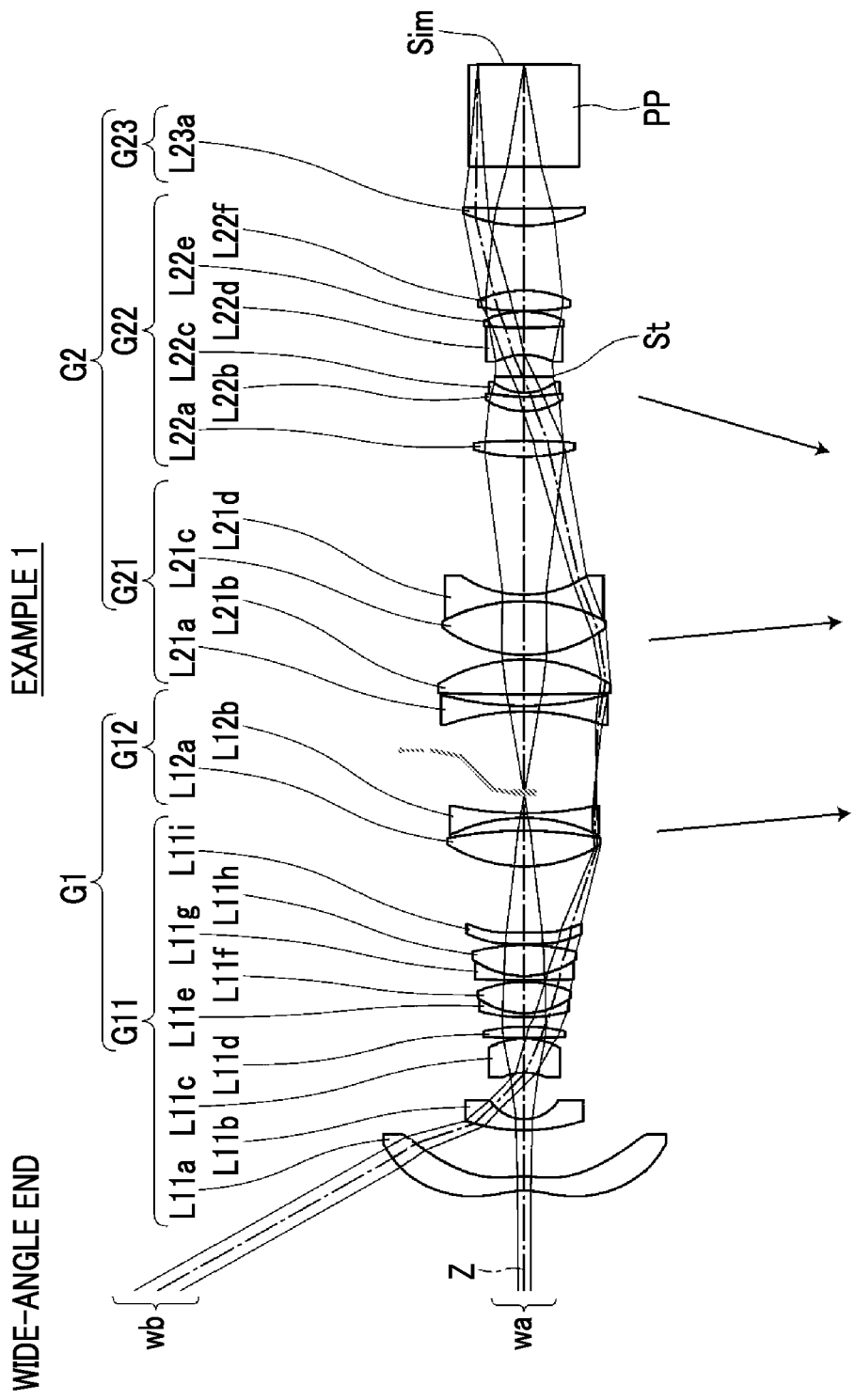
FIG. 1 is a cross-sectional view illustrating a configuration of a zoom lens (common to Example 1) according to an embodiment of the present invention.

Hereinafter, embodiments of the present invention will be described with reference to drawings. FIG. 1 is a cross-sectional view illustrating a configuration of a zoom lens according to an embodiment of the present invention. The exemplary configuration shown in FIG. 1 is the same as the configuration of the zoom lens of Examples 1 to be described later. FIG. 1 shows a state at the wide-angle end, where an image display surface Sim side is the reduction side, a lens L11a side of the first optical system G1 is a magnification side, and an aperture stop St shown in the drawing does not necessarily show its real size and shape, but show a position on an optical axis Z. Further, in FIG. 1, on-axis rays wa and rays with a maximum angle of view wb are also shown together.

This zoom lens is, for example, mounted on a projection display device, and can be used to project image information displayed on the light valve onto the screen. In FIG. 1, assuming that the zoom lens is mounted on the projection display device, an optical member PP such as a filter or a prism used in a color synthesizing section or an illumination light separating section, and an image display surface Sim of a light valve positioned on a reduction side surface of the optical member PP are also shown. In the projection display device, rays, which are made to have image information through the image display surface Sim on the image display element, are incident into the zoom lens through the optical member PP, and are transmitted onto a screen, which is not shown in the drawing, through the zoom lens.

As shown in FIG. 1, a zoom lens of the present embodiment forms an intermediate image I at a position conjugate to a reduction side imaging plane (image display surface Sim) and forms the intermediate image again on a magnification side imaging plane. The zoom lens includes: a first optical system G1 on the magnification side; and a second optical system G2 on the reduction side. The intermediate image is formed therebetween. The first optical system G1 includes, in order from the magnification side, a first-1 lens group G11 which has a positive refractive power, and a first-2 lens group G12 which has a positive refractive power. The second optical system G2 includes, in order from the magnification side, a second-1 lens group G21 which has a positive refractive power, a second-2 lens group G22 which has a positive refractive power, and a second-3 lens group G23 which has a positive refractive power. The first-2 lens group G12, the second-1 lens group G21, and the second-2 lens group G22 are moved by changing spacings between the groups adjacent to each other in a direction of an optical axis during zooming. In addition, the first-1 lens group G11 and the second-3 lens group G23 remain stationary with respect to the reduction side imaging plane during zooming.

In a normal zoom lens of a system which does not form an intermediate image, in a case where an increase in angle of view is intended to be achieved by shortening a focal length thereof, the size of the magnification side lens inevitably becomes excessively large. However, in a manner similar to that of the present embodiment, in a zoom lens of a system which forms an intermediate image, it is possible to shorten a back focal length of the lens system (in the example shown in FIG. 1, the first optical system G1) closer to the magnification side than the intermediate image. In addition, it is possible to decrease a magnification side lens diameter, and this configuration is appropriate for achieving an increase in angle of view by shortening a focal length thereof.

Further, zooming is performed by moving a lens system closer to the reduction side than the intermediate image. As for the zooming operation, change in relay magnification of the lens system closer to the reduction side than the intermediate image corresponds to change in size of the intermediate image, and thus it is possible to achieve an optically simple configuration. However, in a case where the zoom ratio is intended to be increased by using only the lens system closer to the reduction side than the intermediate image, the change in relay magnification, that is, the change in size of the intermediate image becomes large. Therefore, this causes an increase in magnification side lens diameter in the lens system closer to the reduction side than the intermediate image. Further, in only the lens system closer to the reduction side than the intermediate image, zooming is performed without change in position of the intermediate image. Thus, a problem arises in that spherical aberration at the telephoto end becomes large due to an increase in zoom ratio.

Accordingly, during zooming, by moving not only the second-1 lens group G21 and the second-2 lens group G22 closer to the reduction side than the intermediate image but also the first-2 lens group G12 closer to the magnification side than the intermediate image, it is possible to a correction operation for suppressing the increase in spherical aberration at the telephoto end while providing the zooming operation accompanied with the increase in magnification. In addition, it is possible to reduce fluctuation in aberrations during zooming while maintaining favorable telecentricity in the entire zooming range.

Further, the second-3 lens group G23, which remains stationary with respect to the reduction side imaging plane during zooming and has a positive refractive power, is disposed to be closest to the reduction side. Thereby, it is possible to reduce fluctuation in aberrations during zooming while maintaining telecentricity.

It is preferable that the zoom lens of the present invention satisfies the following conditional expression (1). By not allowing the result of the conditional expressions (1) to be equal to or less than the lower limit, the power of the first-2 lens group G12 can be prevented from becoming excessively strong. Thus, an incident angle of rays entering into the second optical system G2 does not become excessively oblique to an optical axis Z. As a result, it becomes easy not only to ensure a zoom ratio, but also to perform aberration correction in the whole lens system. By not allowing the result of the conditional expressions (1) to be equal to or greater than the upper limit, the power of the first-2 lens group G12 can be prevented from becoming excessively weak. Thus, it is possible to appropriately correct spherical aberration even at the telephoto end. In addition, in a case where the following conditional expression (1-1) is satisfied, it is possible to obtain more favorable characteristics.

$$5 < f12/|fw| < 20 \tag{1}$$

$$7 < f12/|fw| < 15 \tag{1-1}$$

Here, f12 is a focal length of the first-2 lens group G12, and fw is a focal length of the whole system at the wide-angle end.

It is preferable that the zoom lens satisfies the following conditional expression (2). By not allowing the result of the conditional expression (2) to be equal to or less than the lower limit, the power of the second-2 lens group G22 can be prevented from becoming excessively strong. Thus, it is possible to suppress fluctuation in longitudinal chromatic aberration and spherical aberration during zooming. By not allowing the result of the conditional expression (2) to be equal to or greater than the upper limit, the power of the second-2 lens group G22 can be prevented from becoming excessively weak. Thus, an amount of movement for ensuring the desired zoom ratio is minimized, and this contributes to reduction in lens total length. In addition, in a case where the following conditional expression (2-1) is satisfied, it is possible to obtain more favorable characteristics.

$$5 < f22/|fw| < 12 \quad (2)$$

$$7 < f22/|fw| < 10 \quad (2\text{-}1)$$

Here, f22 is a focal length of the second-2 lens group G22, and fw is a focal length of the whole system at the wide-angle end.

It is preferable that the zoom lens satisfies the following conditional expression (3). By not allowing the result of the conditional expression (3) to be equal to or less than the lower limit, the power of the second-3 lens group G23 can be prevented from becoming excessively strong. Thus, by minimizing an amount of occurrence of lateral chromatic aberration, it is possible to easily correct lateral chromatic aberration in other groups. By not allowing the result of the conditional expression (3) to be equal to or greater than the upper limit, the power of the second-3 lens group G23 can be prevented from becoming excessively weak. Thus, it becomes easy to attain a state where the zoom lens is telecentric on the reduction side. In addition, in a case where the following conditional expression (3-1) is satisfied, it is possible to obtain more favorable characteristics.

$$5 < f23/|fw| < 12 \quad (3)$$

$$6.8 < f23/|fw| < 10 \quad (3\text{-}1)$$

Here, f23 is a focal length of the second-3 lens group G23, and fw is a focal length of the whole system at the wide-angle end.

It is preferable that, during zooming from the wide-angle end to a telephoto end, the second-1 lens group G21 moves from the magnification side to the reduction side, and the second-2 lens group G22 moves from the reduction side to the magnification side. With such a configuration, it is possible to reduce fluctuation in aberrations during zooming.

It is preferable that the zoom lens satisfies the following conditional expression (4). By not allowing the result of the conditional expression (4) to be equal to or less than the lower limit, the power of the lens closest to the magnification side L21a in the second-1 lens group G21 can be prevented from becoming excessively weak. Thus, it becomes easy to correct distortion. By not allowing the result of the conditional expression (4) to be equal to or greater than the upper limit, the power of the lens closest to the magnification side L21a in the second-1 lens group G21 can be prevented from becoming excessively strong. Thus, the force of deflecting rays toward the outside becomes weak, and it is possible to prevent the lens diameter and the lens total length of the subsequent (reduction side) lens from being increased. In addition, in a case where the following conditional expression (4-1) is satisfied, it is possible to obtain more favorable characteristics.

$$-25 < f211/|fw| < -2 \quad (4)$$

$$-20 < f211/|fw| < -3 \quad (4\text{-}1)$$

Here, f211 is a focal length of a lens closest to the magnification side in the second-1 lens group G21, and fw is a focal length of the whole system at the wide-angle end.

It is preferable that the lens closest to the magnification side in the second-1 lens group G21 is a second-1-1 lens L21a which has a negative refractive power, a lens adjacent to the reduction side of the second-1-1 lens L21a is a second-1-2 lens L21b which has a positive refractive power, and the zoom lens satisfies the following conditional expression (5). By not allowing the result of the conditional expression (5) to be equal to or less than the lower limit, it is possible to prevent a difference in Abbe number between the second-1-1 lens L21a which has a negative refractive power and the second-1-2 lens L21b which has a positive refractive power. Therefore, it is possible to appropriately correct longitudinal chromatic aberration in the two lenses. As a result, it does not become necessary to excessively increase the number of lenses in the second-1 lens group G21. By not allowing the result of the conditional expression (5) to be equal to or greater than the upper limit, expensive glass materials do not become necessary for the second-1-1 lens L21a which has a negative refractive power and the second-1-2 lens L21b which has a positive refractive power. As a result, it is possible to prevent costs thereof from being increased. In addition, in a case where the following conditional expression (5-1) is satisfied, it is possible to obtain more favorable characteristics.

$$30 < v211 - v212 < 70 \quad (5)$$

$$34 < v211 - v212 < 60 \quad (5\text{-}1)$$

Here, v211 is an Abbe number of the second-1-1 lens L21a on the basis of the d line, and v212 is an Abbe number of the second-1-2 lens L21b on the basis of the d line.

It is preferable that the zoom lens satisfies the following conditional expression (6). By not allowing the result of the conditional expression (6) to be equal to or less than the lower limit, it is possible to prevent the back focal length from being excessively shortened. Thus, it becomes easy to arrange the color synthesizing prism and the like. In addition, in a case where the following conditional expression (6-1) is satisfied, it is possible to obtain more favorable characteristics. By not allowing the result of the conditional expression (6-1) to be equal to or greater than the upper limit, it is possible to prevent the back focal length from becoming excessively large and the lens diameter from becoming large. Thus, it is possible to suppress an increase in number of lenses and an increase in costs of materials.

$$2 < Bfw/|fw| \quad (6)$$

$$3 < Bfw/|fw| < 10 \quad (6\text{-}1)$$

Here, Bfw is a back focal length of the whole system as an air conversion length at the wide-angle end, and fw is a focal length of the whole system at the wide-angle end.

Next, numerical examples of the zoom lens of the present invention will be described.

First, a zoom lens of Example 1 will be described. FIG. 1 is a cross-sectional diagram illustrating a configuration of the zoom lens of Example 1. In addition, in FIG. 1 and FIGS. 2 and 3 corresponding to Examples 2 and 3 to be described later, an image display surface Sim side is the reduction side, and a lens L11a side of the first optical system G1 is a magnification side, an aperture stop St shown in the drawing does not necessarily show its real size and shape, but show a position on the optical axis Z. Further, in FIGS. 1 to 3, on-axis rays wa and rays with a maximum angle of view wb are also shown together.

The zoom lens of Example 1 includes a first optical system G1 on the magnification side, and a second optical system G2 on the reduction side, in a state where the intermediate image is formed therebetween. The first optical system G1 includes a first-1 lens group G11 and a first-2 lens group G12. The second optical system G2 includes a second-1 lens group G21, a second-2 lens group G22, and a second-3 lens group G23.

The first-2 lens group G12, the second-1 lens group G21, and the second-2 lens group G22 are moved by changing spacings between the groups adjacent to each other in a direction of an optical axis during zooming. In addition, the first-1 lens group G11 and the second-3 lens group G23 remain stationary with respect to the reduction side imaging plane during zooming.

The first-1 lens group G11 includes nine lenses as lenses L11a to L11i. The first-2 lens group G12 includes two lenses as lenses L12a and L12b. The second-1 lens group G21 includes four lenses as lenses L21a to L21d. The second-2 lens group G22 includes six lenses as lenses L22a to L22f. The second-3 lens group G23 includes one lens as only a lens L23a.

Table 1 shows lens data of the zoom lens of Example 1, Table 2 shows data about specification, Table 3 shows surface spacings which are variable during zooming, and Table 4 shows data about aspheric coefficients thereof. Hereinafter, meanings of the reference signs in the tables are, for example, as described in Example 1, and are basically the same as those in Examples 2 and 3.

In the lens data of Table 1, the column of the surface number shows surface numbers. The surface of the elements closest to the magnification side is the first surface, and the surface numbers sequentially increase toward the reduction side. The column of the radius of curvature shows radii of curvature of the respective surfaces. The column of the on-axis surface spacing shows spacings on the optical axis Z between the respective surfaces and the subsequent surfaces. Further, the column of n shows a refractive index of each optical element at the d line (a wavelength of 587.6 nm), and the column of ν shows an Abbe number of each optical element at the d line (a wavelength of 587.6 nm). Here, the sign of the radius of curvature is positive in a case where a surface has a shape convex toward the magnification side, and is negative in a case where a surface has a shape convex toward the reduction side. In the lens data, the aperture stop St and the optical member PP are additionally noted. In a place of a surface number of a surface corresponding to the aperture stop St, the surface number and a term of (stop) are noted. Further, in the lens data, in each place of the surface spacing which is variable during zooming, DD[surface number] is noted. Numerical values each corresponding to the DD[surface number] are shown in Table 3.

In the data about the specification of Table 2, values of the zoom ratio, the focal length f', the F number FNo., and the total angle of view 2ω are noted.

In the lens data of Table 1, the reference sign * is attached to surface numbers of aspheric surfaces, and radii of curvature of the aspheric surfaces are represented by numerical values of paraxial radii of curvature. In the data about aspheric coefficients of Table 4, surface numbers of aspheric surfaces, and aspheric coefficients of these aspheric surfaces are noted. The "E±n" (n: an integer) in numerical values of the aspheric coefficients of Table 4 indicates "×10$^{±n}$". The aspheric coefficients are values of the coefficients KA and Am (m=3 . . . 20) in aspheric surface expression represented by the following expression.

$$Zd = C \cdot h^2 / \{1 + (1 - KA \cdot C^2 \cdot h^2)^{1/2}\} + \Sigma Am \cdot h^m$$

Here, Zd is an aspheric surface depth (a length of a perpendicular from a point on an aspheric surface at height h to a plane that is perpendicular to the optical axis and contacts with the vertex of the aspheric surface), h is a height (a distance from the optical axis), C is an inverse of a paraxial radius of curvature, and KA and Am are aspheric coefficients (m=3 . . . 20).

TABLE 1

EXAMPLE 1 • LENS DATA (n AND ν ARE BASED ON d LINE)

| SURFACE NUMBER | RADIUS OF CURVATURE | SURFACE SPACING | n | ν |
|---|---|---|---|---|
| *1 | −15.3257 | 3.1041 | 1.53158 | 55.08 |
| *2 | −33.1892 | 10.0852 | | |
| 3 | 40.4538 | 2.4685 | 1.62041 | 60.29 |
| 4 | 8.6430 | 10.0936 | | |
| 5 | −11.2762 | 7.2577 | 1.83481 | 42.72 |
| 6 | −17.0955 | 0.1381 | | |
| 7 | 182.9952 | 2.4765 | 1.89286 | 20.36 |
| 8 | −36.5411 | 2.0001 | | |
| 9 | 35.6081 | 0.9317 | 1.75520 | 27.51 |
| 10 | 16.8209 | 6.8261 | 1.49700 | 81.61 |
| 11 | −25.4795 | 0.3399 | | |
| 12 | 267.6247 | 0.9304 | 1.84666 | 23.78 |
| 13 | 18.9387 | 6.7530 | 1.49700 | 81.61 |
| 14 | −42.8291 | 0.1383 | | |
| *15 | 106.4754 | 2.6191 | 1.49100 | 57.58 |
| *16 | −349.9175 | DD[16] | | |
| 17 | 30.8964 | 7.7906 | 1.80400 | 46.58 |
| 18 | −83.2641 | 2.7908 | | |
| 19 | −35.5354 | 1.0345 | 1.54814 | 45.78 |
| 20 | 74.1099 | DD[20] | | |
| 21 | −50.1018 | 1.2416 | 1.48749 | 70.24 |
| 22 | 67.5112 | 2.4368 | | |
| 23 | 445.9501 | 7.6268 | 1.80518 | 25.42 |
| 24 | −35.0369 | 1.0354 | | |
| 25 | 28.9876 | 11.7241 | 1.80100 | 34.97 |
| 26 | −37.3021 | 1.3867 | 1.78472 | 25.68 |
| 27 | 24.2172 | DD[27] | | |
| 28 | 40.2271 | 3.4845 | 1.80610 | 40.93 |
| 29 | −134.3021 | 6.4061 | | |
| 30 | 14.8879 | 3.2023 | 1.59282 | 68.62 |
| 31 | 40.2390 | 0.8342 | 1.51742 | 52.43 |
| 32 | 10.6429 | 3.4847 | | |
| 33 (STOP) | ∞ | 4.7459 | | |
| 34 | −14.0751 | 5.7552 | 1.85478 | 24.80 |
| 35 | 121.0700 | 3.5097 | 1.59282 | 68.62 |
| 36 | −20.9375 | 0.1385 | | |
| 37 | 53.7339 | 4.4732 | 1.43875 | 94.66 |
| 38 | −23.5498 | DD[38] | | |
| 39 | 32.9929 | 3.7045 | 1.80809 | 22.76 |
| 40 | 286.0748 | 9.1738 | | |
| 41 | ∞ | 22.2759 | 1.51633 | 64.14 |
| 42 | ∞ | | | |

TABLE 2

EXAMPLE 1 • SPECIFICATION (d LINE)

|  | WIDE-ANGLE END | TELEPHOTO END |
|---|---|---|
| ZOOM RATIO | 1.0 | 1.6 |
| f' | -5.71 | -9.14 |
| FNo. | 2.00 | 2.32 |
| 2ω [°] | 120.4 | 95.4 |

TABLE 3

EXAMPLE 1 • SURFACE SPACING

|  | WIDE-ANGLE END | TELEPHOTO END |
|---|---|---|
| DD[16] | 14.3660 | 18.1309 |
| DD[20] | 22.1353 | 27.6169 |
| DD[27] | 30.2604 | 4.8273 |
| DD[38] | 14.1661 | 30.3527 |

TABLE 4

EXAMPLE 1 • ASPHERIC COEFFICIENT

| | SURFACE NUMBER | | |
|---|---|---|---|
| | 1 | 2 | 15 |
| KA | 2.4141499E-01 | 1.2443569E+00 | 1.0000000E+00 |
| A3 | -1.0548641E-03 | -8.8448311E-04 | 9.9188567E-05 |
| A4 | 8.3674285E-04 | 6.3492583E-04 | 3.0661548E-05 |
| A5 | -6.2203974E-05 | -2.5148517E-05 | 4.3824644E-05 |
| A6 | -1.6931733E-06 | -4.7634497E-06 | -1.4133218E-05 |
| A7 | 4.3265443E-07 | 4.6820320E-07 | 1.7507446E-06 |
| A8 | -9.2963393E-09 | 7.7190760E-10 | 1.6107809E-07 |
| A9 | -1.4486672E-09 | -1.7808022E-09 | -6.5380545E-08 |
| A10 | 7.8786293E-11 | 4.9251890E-11 | 2.8124535E-09 |
| A11 | 1.7996418E-12 | 3.5072008E-12 | 8.8411414E-10 |
| A12 | -2.2614666E-13 | -2.0320674E-13 | -1.0033635E-10 |
| A13 | 1.6945437E-15 | -1.2839303E-15 | -3.1296368E-12 |
| A14 | 3.0897395E-16 | 3.2125472E-16 | 9.9989872E-13 |
| A15 | -7.5571704E-18 | -4.7675296E-18 | -2.7219117E-14 |
| A16 | -1.7512626E-19 | -2.3371888E-19 | -3.9426279E-15 |
| A17 | 8.0909075E-21 | 8.0064105E-21 | 2.5945002E-16 |
| A18 | -9.3635563E-24 | 9.2687753E-24 | 2.3858327E-18 |
| A19 | -2.9829776E-24 | -3.5001412E-24 | -6.0714673E-19 |
| A20 | 3.4190869E-26 | 4.0836144E-26 | 1.4353112E-20 |

| | SURFACE NUMBER |
|---|---|
| | 16 |
| KA | 1.0000000E+00 |
| A3 | -1.9710878E-04 |
| A4 | 2.7699157E-04 |
| A5 | -3.4909821E-05 |
| A6 | 5.8330314E-07 |
| A7 | 1.2714550E-06 |
| A8 | -1.8605027E-07 |
| A9 | -5.4440996E-09 |
| A10 | 2.8459871E-09 |
| A11 | -9.8577866E-11 |
| A12 | -1.9648267E-11 |
| A13 | 1.5012748E-12 |
| A14 | 5.0112842E-14 |
| A15 | -8.7059294E-15 |
| A16 | 1.2726604E-16 |
| A17 | 2.3563163E-17 |
| A18 | -1.0153859E-18 |
| A19 | -2.4244280E-20 |
| A20 | 1.6658139E-21 |

Figure 4:
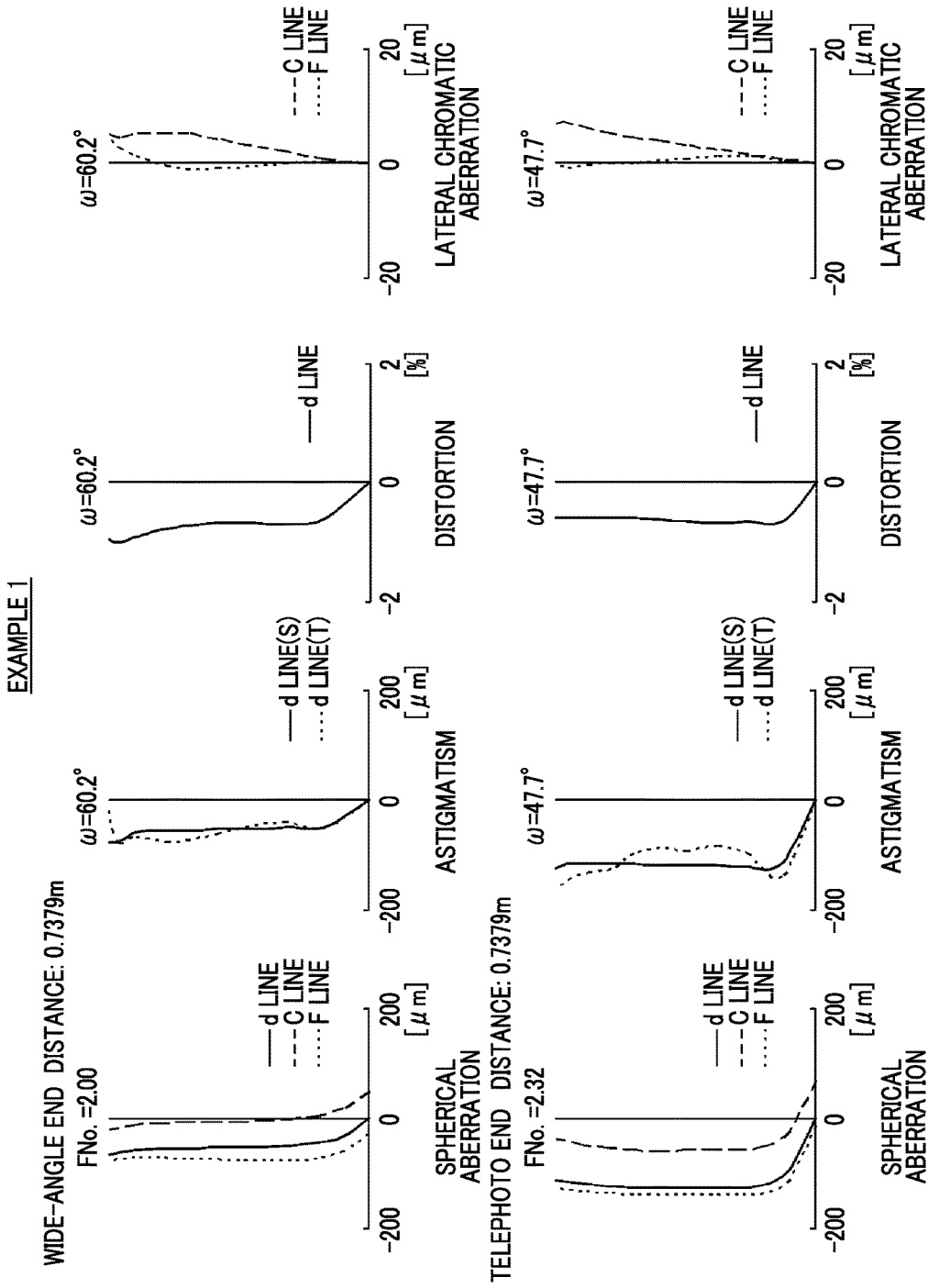
FIG. 4 is a diagram of aberrations of the zoom lens of Example 1 of the present invention.

FIG. 4 shows aberration diagrams of the zoom lens of Example 1. In addition, in order from the upper left side of FIG. 4, spherical aberration, astigmatism, distortion, and lateral chromatic aberration at the wide-angle end are shown. In order from the lower left side of FIG. 4, spherical aberration, astigmatism, distortion, and lateral chromatic aberration at the telephoto end are shown. These aberration diagrams show states in a case where the projection distance is set as distances noted in the aberration diagrams. The aberration diagrams illustrating spherical aberration, astigmatism, and distortion indicate aberrations that occur in a case where the d line (a wavelength of 587.6 nm) is set as a reference wavelength. In the spherical aberration diagram, aberrations at the d line (a wavelength of 587.6 nm), the C line (a wavelength of 656.3 nm), and the F line (a wavelength of 486.1 nm) are respectively indicated by the solid line, the long dashed line, and the short dashed line. In the astigmatism diagram, aberrations in sagittal and tangential directions are respectively indicated by the solid line and the short dashed line. In the lateral chromatic aberration, aberrations at the C line (wavelength 656.3 nm) and F line (wavelength 486.1 nm) are respectively indicated by the long dashed line and the short dashed line. In the spherical aberration diagram, FNo. means an F number. In the other aberration diagrams, ω means a half angle of view.

Reference signs, meanings, and description methods of the respective data pieces according to Example 1 described above are the same as those in the following examples unless otherwise noted. Therefore, in the following description, repeated description will be omitted.

Figure 2:
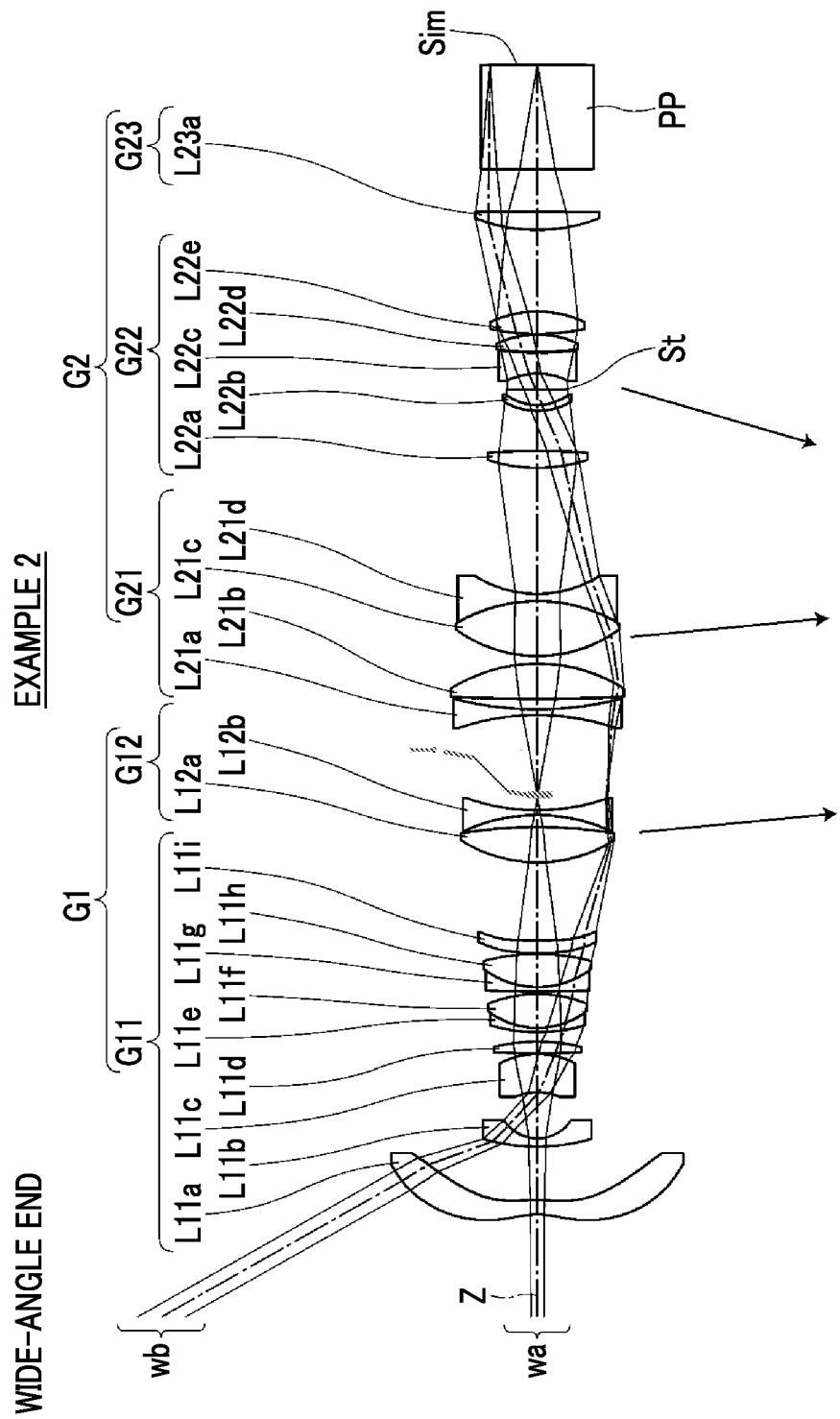
FIG. 2 is a cross-sectional view illustrating a configuration of a zoom lens of Example 2 of the present invention.
Figure 5:
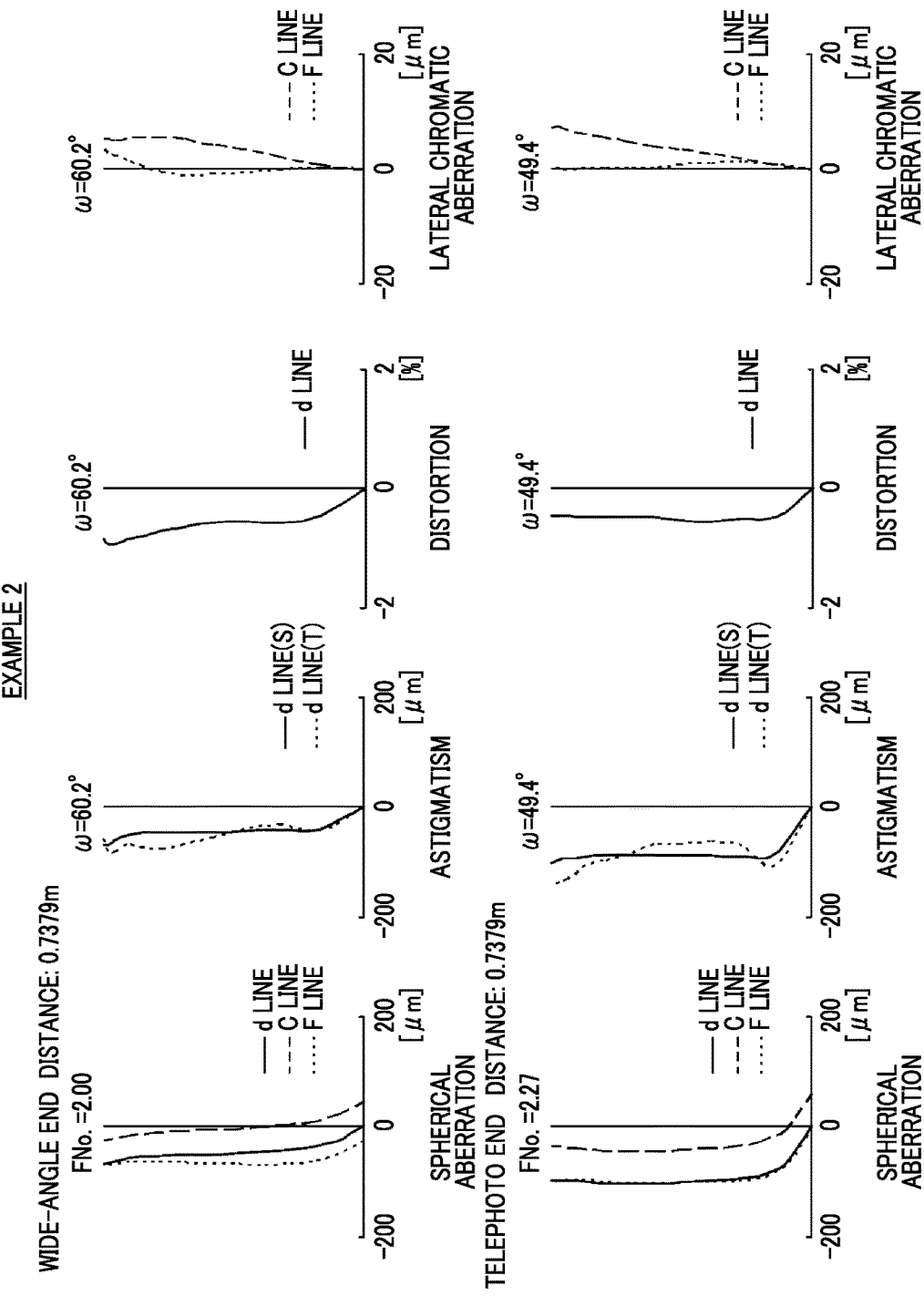
FIG. 5 is a diagram of aberrations of the zoom lens of Example 2 of the present invention.

Next, a zoom lens of Example 2 will be described. FIG. 2 is a cross-sectional diagram illustrating a configuration of the zoom lens of Example 2. The zoom lens of Example 2 has the same lens groups and has the same number of lenses as that of Example 1 except that the second-2 lens group G22 includes five lenses as the lenses L22a to L22e. Table 5 shows lens data of the zoom lens of Example 2, Table 6 shows data about specification, Table 7 shows surface spacings which are variable during zooming, Table 8 shows data about aspheric coefficients thereof, and FIG. 5 shows aberration diagrams.

TABLE 5

EXAMPLE 2 • LENS DATA (n AND ν ARE BASED ON d LINE)

| SURFACE NUMBER | RADIUS OF CURVATURE | SURFACE SPACING | n | ν |
|---|---|---|---|---|
| *1 | -15.3257 | 3.1037 | 1.53158 | 55.08 |
| *2 | -34.7664 | 11.4247 | | |
| 3 | 40.3127 | 1.7647 | 1.62299 | 58.16 |
| 4 | 8.3917 | 9.8338 | | |
| 5 | -10.9413 | 7.9941 | 1.83481 | 42.72 |
| 6 | -16.9770 | 0.1377 | | |
| 7 | 188.6544 | 2.5038 | 1.89286 | 20.36 |
| 8 | -38.7881 | 1.9933 | | |
| 9 | 34.2031 | 0.9460 | 1.72825 | 28.46 |
| 10 | 16.8209 | 7.2415 | 1.49700 | 81.61 |
| 11 | -26.7371 | 0.5298 | | |
| 12 | 349.2887 | 0.9309 | 1.84666 | 23.78 |
| 13 | 18.5093 | 7.1110 | 1.49700 | 81.61 |
| 14 | -41.7340 | 0.1386 | | |
| *15 | 79.5713 | 2.7662 | 1.49100 | 57.58 |
| *16 | -621.3076 | DD[16] | | |
| 17 | 29.6563 | 7.5688 | 1.80400 | 46.58 |
| 18 | -95.4511 | 2.5605 | | |
| 19 | -36.6865 | 1.0339 | 1.51742 | 52.43 |
| 20 | 44.0816 | DD[20] | | |
| 21 | -51.4439 | 1.2418 | 1.48749 | 70.24 |
| 22 | 69.7223 | 2.2483 | | |
| 23 | 441.0518 | 7.4804 | 1.80518 | 25.42 |
| 24 | -34.1355 | 1.6469 | | |
| 25 | 28.8569 | 11.7241 | 1.80100 | 34.97 |
| 26 | -33.2020 | 1.5448 | 1.78472 | 25.68 |

TABLE 5-continued

EXAMPLE 2 • LENS DATA (n AND ν ARE BASED ON d LINE)

| SURFACE NUMBER | RADIUS OF CURVATURE | SURFACE SPACING | n | ν |
|---|---|---|---|---|
| 27 | 24.1607 | DD[27] | | |
| 28 | 33.6046 | 3.5630 | 1.80100 | 34.97 |
| 29 | −180.2001 | 8.5971 | | |
| 30 | 13.5482 | 1.2464 | 1.51742 | 52.43 |
| 31 | 10.9987 | 3.2101 | | |
| 32 (STOP) | ∞ | 3.4919 | | |
| 33 | −14.0473 | 4.4740 | 1.85478 | 24.80 |
| 34 | 70.6017 | 3.6976 | 1.59282 | 68.62 |
| 35 | −20.0695 | 0.1380 | | |
| 36 | 48.5692 | 4.7586 | 1.43875 | 94.66 |
| 37 | −23.3893 | DD[37] | | |
| 38 | 35.4283 | 3.8641 | 1.80809 | 22.76 |
| 39 | ∞ | 9.1746 | | |
| 40 | ∞ | 22.2759 | 1.51633 | 64.14 |
| 41 | ∞ | | | |

TABLE 6

EXAMPLE 2 • SPECIFICATION (d LINE)

| | WIDE-ANGLE END | TELEPHOTO END |
|---|---|---|
| ZOOM RATIO | 1.0 | 1.5 |
| f | −5.71 | −8.57 |
| FNo. | 2.00 | 2.27 |
| 2ω [°] | 120.4 | 98.8 |

TABLE 7

EXAMPLE 2 • SURFACE SPACING

| | WIDE-ANGLE END | TELEPHOTO END |
|---|---|---|
| DD[16] | 16.5809 | 19.4606 |
| DD[20] | 20.2889 | 25.0617 |
| DD[27] | 27.0637 | 5.4902 |
| DD[37] | 17.4423 | 31.3634 |

TABLE 8

EXAMPLE 2 • ASPHERIC COEFFICIENT

| SURFACE NUMBER | 1 | 2 | 15 |
|---|---|---|---|
| KA | 2.4005572E−01 | 1.2982535E+00 | 1.0000000E+00 |
| A3 | −9.4117956E−04 | −8.1119456E−04 | 8.4641293E−05 |
| A4 | 8.2140376E−04 | 6.3727543E−04 | 6.0083889E−05 |
| A5 | −6.1338797E−05 | −2.7193363E−05 | 1.6551479E−05 |
| A6 | −1.6412446E−06 | −4.5371150E−06 | −7.5231031E−06 |
| A7 | 4.2425029E−07 | 4.9118627E−07 | 1.5936698E−06 |
| A8 | −9.2480460E−09 | −4.2465019E−09 | −4.8437602E−08 |
| A9 | −1.4192032E−09 | −1.7105698E−09 | −3.6848452E−08 |
| A10 | 7.8161464E−11 | 7.7499087E−11 | 4.6263308E−09 |
| A11 | 1.7400643E−12 | 2.3931525E−12 | 2.9213247E−10 |
| A12 | −2.2454204E−13 | −2.8190216E−13 | −8.8147072E−11 |
| A13 | 1.7770892E−15 | 3.5062529E−15 | 2.0337483E−12 |
| A14 | 3.0669185E−16 | 4.1255051E−16 | 6.9640960E−13 |
| A15 | −7.6406657E−18 | −1.4330874E−17 | −4.6551873E−14 |
| A16 | −1.7295229E−19 | −2.3154553E−19 | −2.0436648E−15 |
| A17 | 8.1462036E−21 | 1.7632132E−20 | 2.7187232E−16 |
| A18 | −1.0736468E−23 | −9.6081658E−23 | −1.9938241E−18 |
| A19 | −2.9999139E−24 | −7.2952143E−24 | −5.4287538E−19 |
| A20 | 3.4610499E−26 | 1.0689391E−25 | 1.5952204E−20 |

TABLE 8-continued

EXAMPLE 2 • ASPHERIC COEFFICIENT

| SURFACE NUMBER | 16 |
|---|---|
| KA | 1.0000000E+00 |
| A3 | −1.1528411E−04 |
| A4 | 2.3260739E−04 |
| A5 | −3.3901237E−05 |
| A6 | 1.9336831E−06 |
| A7 | 1.2051151E−06 |
| A8 | −2.5129854E−07 |
| A9 | 1.4573787E−09 |
| A10 | 4.2460303E−09 |
| A11 | −3.1764927E−10 |
| A12 | −3.1421344E−11 |
| A13 | 4.6018352E−12 |
| A14 | 5.3879028E−14 |
| A15 | −3.0930304E−14 |
| A16 | 6.6051246E−16 |
| A17 | 1.0269513E−16 |
| A18 | −4.0507934E−18 |
| A19 | −1.3563390E−19 |
| A20 | 6.9559387E−21 |

Figure 3:
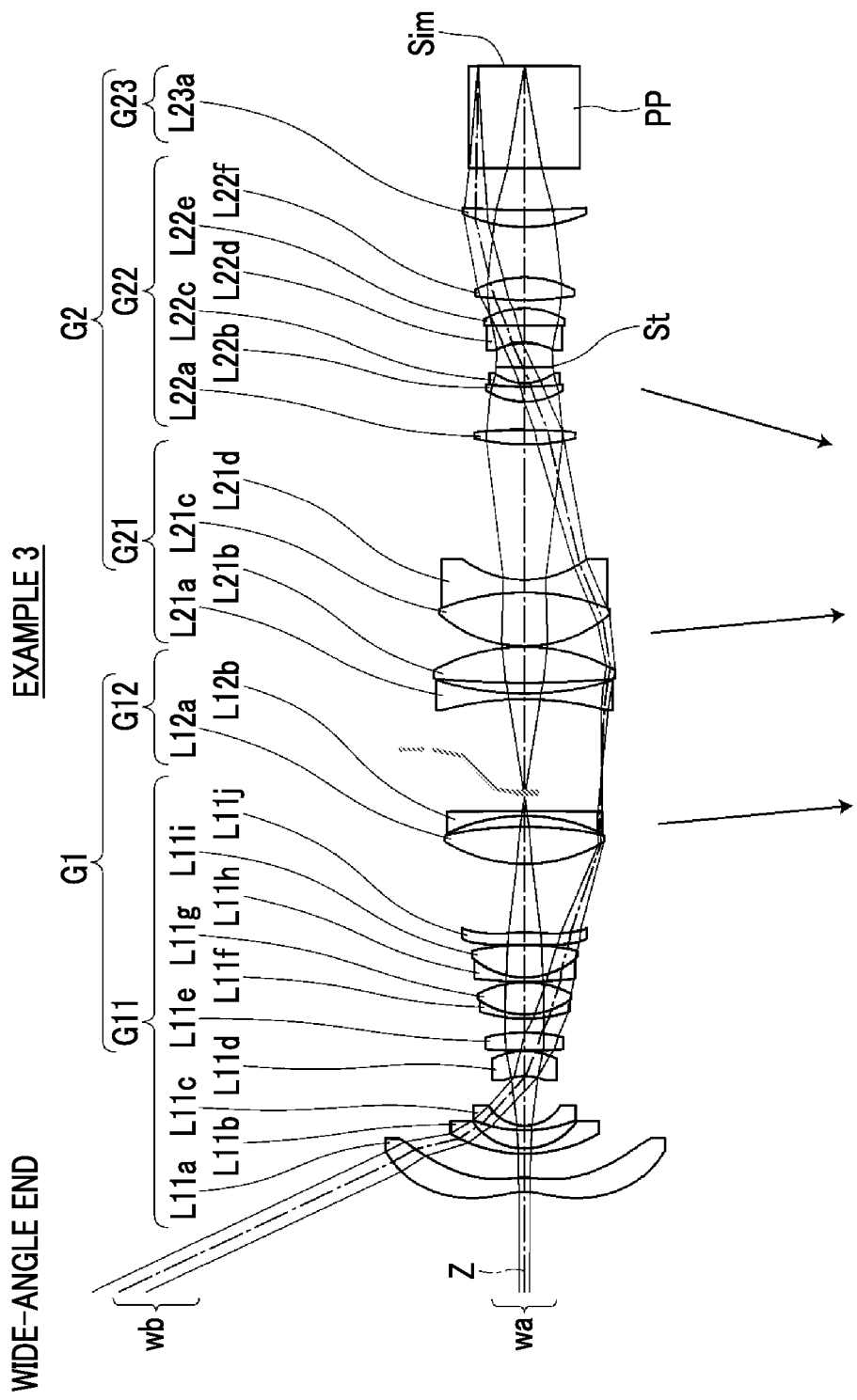
FIG. 3 is a cross-sectional view illustrating a configuration of a zoom lens of Example 3 of the present invention.
Figure 6:
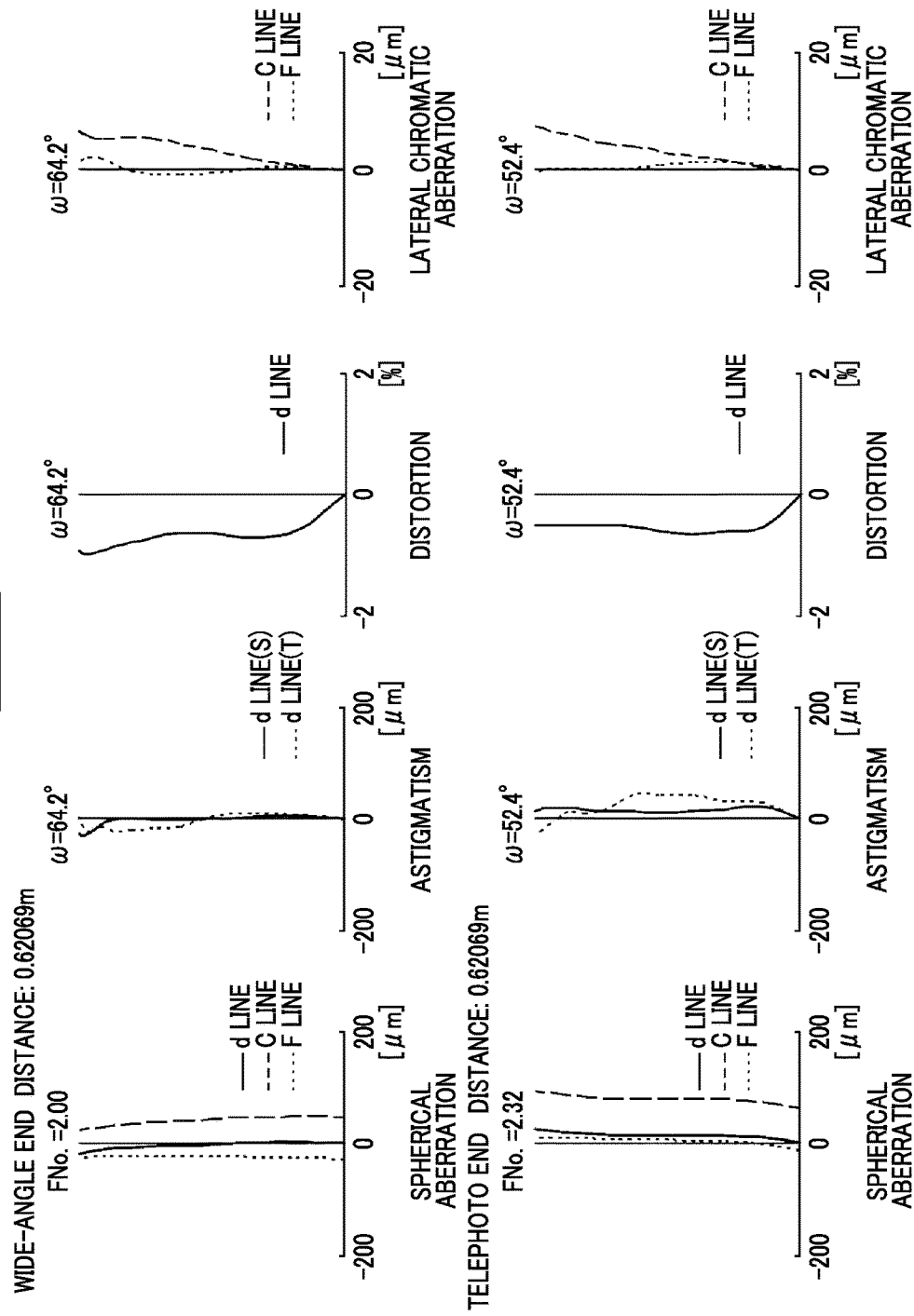
FIG. 6 is a diagram of aberrations of the zoom lens of Example 3 of the present invention.

Next, a zoom lens of Example 3 will be described. FIG. 3 is a cross-sectional diagram illustrating a configuration of the zoom lens of Example 3. The zoom lens of Example 3 has the same lens groups and has the same number of lenses as that of Example 1 except that the first-1 lens group G11 includes ten lenses as the lenses L11a to L11j. Table 9 shows lens data of the zoom lens of Example 3, Table 10 shows data about specification, Table 11 shows surface spacings which are variable during zooming, Table 12 shows data about aspheric coefficients thereof, and FIG. 6 shows aberration diagrams.

TABLE 9

EXAMPLE 3 • LENS DATA (n AND ν ARE BASED ON d LINE)

| SURFACE NUMBER | RADIUS OF CURVATURE | SURFACE SPACING | n | ν |
|---|---|---|---|---|
| *1 | −15.3257 | 3.1028 | 1.53158 | 55.08 |
| *2 | −31.6988 | 5.2042 | | |
| 3 | 30.9863 | 1.1727 | 1.58913 | 61.13 |
| 4 | 13.6578 | 3.9397 | | |
| 5 | 28.3329 | 1.0341 | 1.51633 | 64.14 |
| 6 | 8.9464 | 10.7839 | | |
| 7 | −11.1233 | 5.4675 | 1.83481 | 42.72 |
| 8 | −15.5265 | 0.1372 | | |
| 9 | 143.1892 | 3.6944 | 1.89286 | 20.36 |
| 10 | −37.1115 | 3.0805 | | |
| 11 | 31.3949 | 0.9315 | 1.80518 | 25.42 |
| 12 | 16.8208 | 6.9787 | 1.43700 | 95.10 |
| 13 | −21.4677 | 0.1380 | | |
| 14 | 84.7476 | 0.9304 | 1.84666 | 23.78 |
| 15 | 16.8209 | 7.0661 | 1.53775 | 74.70 |
| 16 | −52.6740 | 0.1386 | | |
| *17 | −58.3536 | 2.6207 | 1.49100 | 57.58 |
| *18 | −35.5498 | DD[18] | | |
| 19 | 32.7044 | 8.0687 | 1.80400 | 46.58 |
| 20 | −79.2698 | 2.4029 | | |
| 21 | −38.0466 | 1.0348 | 1.80400 | 46.58 |
| 22 | −1333.1627 | DD[22] | | |
| 23 | −66.0194 | 1.2407 | 1.51633 | 64.14 |
| 24 | 64.3595 | 2.2877 | | |
| 25 | 201.8116 | 7.8561 | 1.80518 | 25.42 |
| 26 | −39.7236 | 0.1384 | | |
| 27 | 27.4849 | 11.7312 | 1.80100 | 34.97 |
| 28 | −48.0253 | 2.7581 | 1.80518 | 25.42 |
| 29 | 22.2474 | DD[29] | | |
| 30 | 44.3155 | 3.2562 | 1.80400 | 46.58 |
| 31 | −104.7801 | 6.0852 | | |
| 32 | 15.1282 | 3.2596 | 1.59282 | 68.62 |

TABLE 9-continued

EXAMPLE 3 • LENS DATA (n AND ν ARE BASED ON d LINE)

| SURFACE NUMBER | RADIUS OF CURVATURE | SURFACE SPACING | n | ν |
|---|---|---|---|---|
| 33 | 59.6249 | 0.8282 | 1.51742 | 52.43 |
| 34 | 10.7044 | 3.4560 | | |
| 35 (STOP) | ∞ | 5.2553 | | |
| 36 | −13.3432 | 3.6321 | 1.85478 | 24.80 |
| 37 | −5957.1146 | 3.7438 | 1.53775 | 74.70 |
| 38 | −17.0898 | 1.8040 | | |
| 39 | 64.5953 | 4.9353 | 1.43700 | 95.10 |
| 40 | −22.4833 | DD[40] | | |
| 41 | 32.5054 | 3.7499 | 1.80809 | 22.76 |
| 42 | 220.8863 | 9.1701 | | |
| 43 | ∞ | 22.2759 | 1.51633 | 64.14 |
| 44 | ∞ | | | |

TABLE 10

EXAMPLE 3 • SPECIFICATION (d LINE)

| | WIDE-ANGLE END | TELEPHOTO END |
|---|---|---|
| ZOOM RATIO | 1.0 | 1.6 |
| f' | −4.81 | −7.70 |
| FNo. | 2.00 | 2.32 |
| 2ω [°] | 128.4 | 104.8 |

TABLE 11

EXAMPLE 3 • SURFACE SPACING

| | WIDE-ANGLE END | TELEPHOTO END |
|---|---|---|
| DD[18] | 14.9185 | 18.3610 |
| DD[22] | 24.4207 | 29.7437 |
| DD[29] | 29.6253 | 4.8276 |
| DD[40] | 11.0084 | 27.0407 |

TABLE 12

EXAMPLE 3 • ASPHERIC COEFFICIENT

| | SURFACE NUMBER | | |
|---|---|---|---|
| | 1 | 2 | 17 |
| KA | 2.4117736E−01 | 1.1608014E+00 | 1.0000000E+00 |
| A3 | −1.6271941E−03 | −1.2767832E−03 | 4.6160698E−05 |
| A4 | 9.2393927E−04 | 6.4814859E−04 | 1.5700729E−04 |
| A5 | −6.4865923E−05 | −1.8308130E−05 | −9.8767281E−06 |
| A6 | −2.0953765E−06 | −5.1769760E−06 | −1.8540436E−06 |
| A7 | 4.6370052E−07 | 3.8215770E−07 | 1.5724419E−06 |
| A8 | −8.8835584E−09 | 9.3455161E−09 | −2.4267871E−07 |
| A9 | −1.5529544E−09 | −1.5866351E−09 | −1.3005679E−08 |
| A10 | 8.0307856E−11 | 3.1715243E−12 | 6.3587257E−09 |
| A11 | 1.9639440E−12 | 3.9344927E−12 | −2.7272261E−10 |
| A12 | −2.3087125E−13 | −7.2745777E−14 | −6.6948599E−11 |
| A13 | 1.5610063E−15 | −5.0832636E−15 | 6.4982988E−12 |
| A14 | 3.1391634E−16 | 1.4714489E−16 | 2.6061654E−13 |
| A15 | −7.4711657E−18 | 3.6785163E−18 | −5.2614420E−14 |
| A16 | −1.7755804E−19 | −1.5073768E−19 | 3.9616799E−16 |
| A17 | 8.0091867E−21 | −7.8628119E−22 | 1.9339609E−16 |
| A18 | −8.0613382E−24 | 6.3296481E−23 | −5.6822445E−18 |
| A19 | −2.9400840E−24 | −8.8820438E−26 | −2.7192341E−19 |
| A20 | 3.3436139E−26 | −8.5354333E−27 | 1.1491509E−20 |

TABLE 12-continued

EXAMPLE 3 • ASPHERIC COEFFICIENT

| | SURFACE NUMBER |
|---|---|
| | 18 |
| KA | 1.0000000E+00 |
| A3 | 7.5227206E−05 |
| A4 | 1.9942153E−04 |
| A5 | −2.2308171E−05 |
| A6 | 3.8844805E−06 |
| A7 | 4.3203997E−07 |
| A8 | −2.0578667E−07 |
| A9 | 1.4354863E−08 |
| A10 | 2.1761088E−09 |
| A11 | −3.5226020E−10 |
| A12 | −3.9084914E−12 |
| A13 | 3.3735385E−12 |
| A14 | −1.0163967E−13 |
| A15 | −1.6498532E−14 |
| A16 | 8.9330756E−16 |
| A17 | 4.0082629E−17 |
| A18 | −2.9907569E−18 |
| A19 | −3.7359448E−20 |
| A20 | 3.7092475E−21 |

Table 13 shows values corresponding to the conditional expressions (1) to (6) of the zoom lenses of Examples 1 to 3. It should be noted that, in the above-mentioned examples, the d line is set as the reference wavelength, and the values shown in the following Table 13 are values at the reference wavelength.

TABLE 13

| EXPRESSION NUMBER | CONDITIONAL EXPRESSION | EXAMPLE 1 | EXAMPLE 2 | EXAMPLE 3 |
|---|---|---|---|---|
| (1) | f12/\|fw\| | 10.51 | 12.37 | 12.22 |
| (2) | f22/\|fw\| | 8.26 | 8.13 | 9.75 |
| (3) | f23/\|fw\| | 8.03 | 7.67 | 9.71 |
| (4) | f211/\|fw\| | −10.29 | −10.59 | −13.07 |
| (5) | ν211 − ν212 | 44.81 | 44.81 | 38.71 |
| (6) | Bfw/\|fw\| | 4.17 | 4.17 | 4.95 |

As can be seen from the above-mentioned data, each of the zoom lenses of Examples 1 to 3 is a zoom lens of the system that satisfies conditional expressions (1) to (6) and forms an intermediate image, and is a zoom lens that has an F number as bright as 2.3 or less, has a total angle of view as a wide angle of 110° or more, has a zoom ratio as high as 1.4 times, and has high performance by satisfactorily suppressing fluctuation in aberrations during zooming.

Figure 7:
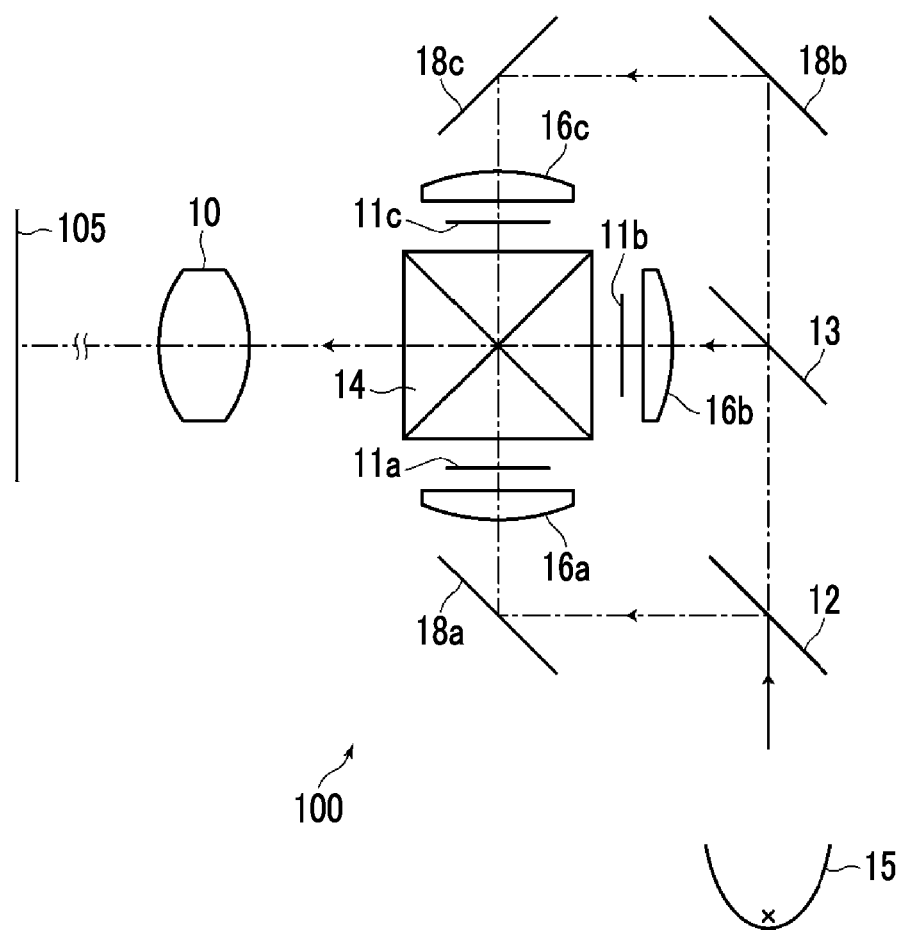
FIG. 7 is a schematic configuration diagram of a projection display device according to an embodiment of the present invention.

Next, a projection display device according to an embodiment of the present invention will be described. FIG. 7 is a schematic configuration diagram of the projection display device according to the embodiment of the present invention. The projection display device 100 shown in FIG. 7 has a zoom lens 10 according to the embodiment of the present invention, a light source 15, transmissive display elements 11a to 11c as light valves corresponding to respective color light beams, dichroic mirrors 12 and 13 for color separation, a cross dichroic prism 14 for color synthesis, condenser lenses 16a to 16c, and total reflection mirrors 18a to 18c for deflecting the optical path. In FIG. 7, the zoom lens 10 is schematically illustrated. Further, an integrator is disposed between the light source 15 and the dichroic mirror 12, but illustration thereof is omitted in FIG. 7.

White light originating from the light source 15 is separated into rays with three colors (G light, B light, R light) through the dichroic mirrors 12 and 13. Thereafter, the rays respectively pass through the condenser lenses 16a to 16c, are incident into and modulated through the transmissive display elements 11a to 11c respectively corresponding to the rays with the respective colors, are subjected to color synthesis through the cross dichroic prism 14, and are subsequently incident into the zoom lens 10. The zoom lens 10 projects an optical image, which is formed by the light modulated through the transmissive display elements 11a to 11c, onto a screen 105.

Figure 8:
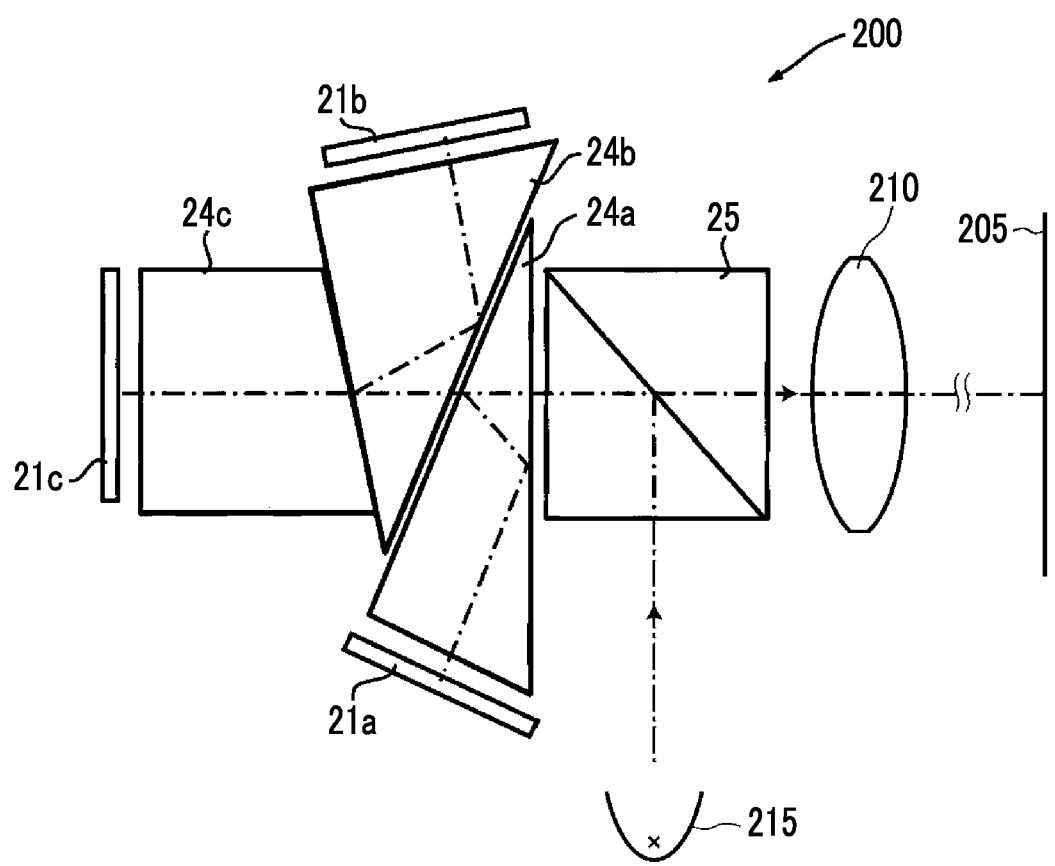
FIG. 8 is a schematic configuration diagram of a projection display device according to another embodiment of the present invention.

FIG. 8 is a schematic configuration diagram of a projection display device according to another embodiment of the present invention. The projection display device 200 shown in FIG. 8 has a zoom lens 210 according to the embodiment of the present invention, a light source 215, DMD elements 21a to 21c as light valves corresponding to respective color light beams, total internal reflection (TIR) prisms 24a to 24c for color separation and color synthesis, and a polarization separating prism 25 that separates illumination light and projection light. In FIG. 8, the zoom lens 210 is schematically illustrated. Further, an integrator is disposed between the light source 215 and the polarization separating prism 25, but illustration thereof is omitted in FIG. 8.

White light originating from the light source 215 is reflected on a reflective surface inside the polarization separating prism 25, and is separated into rays with three colors (G light, B light, R light) through the TIR prisms 24a to 24c. The separated rays with the respective colors are respectively incident into and modulated through the corresponding DMD elements 21a to 21c, travel through the TIR prisms 24a to 24c again in a reverse direction, are subjected to color synthesis, are subsequently transmitted through the polarization separating prism 25, and are incident into the zoom lens 210. The zoom lens 210 projects an optical image, which is formed by the light modulated through the DMD elements 21a to 21c, onto a screen 205.

Figure 9:
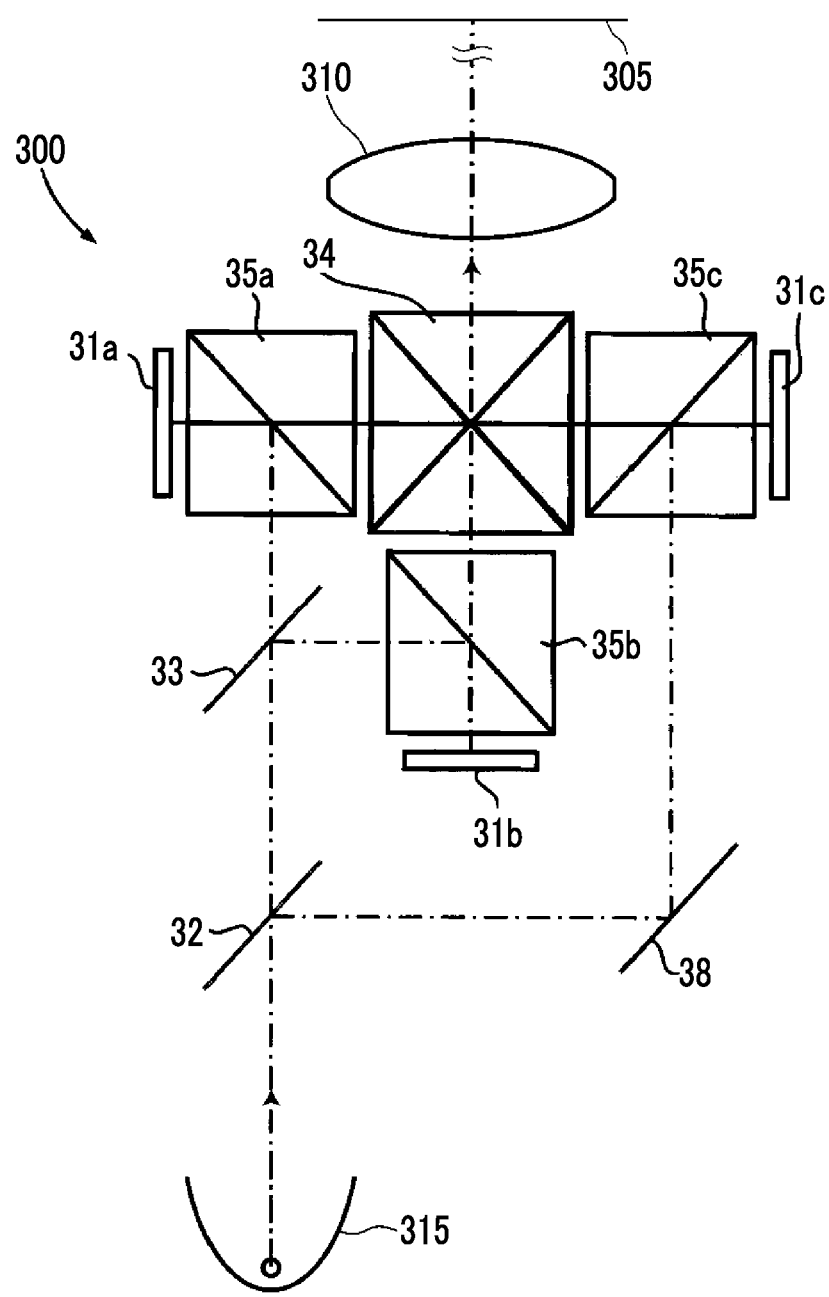
FIG. 9 is a schematic configuration diagram of a projection display device according to still another embodiment of the present invention.

FIG. 9 is a schematic configuration diagram of a projection display device according to still another embodiment of the present invention. The projection display device 300 shown in FIG. 9 has a zoom lens 310 according to the embodiment of the present invention, a light source 315, reflective display elements 31a to 31c as light valves corresponding to respective color light beams, dichroic mirrors 32 and 33 for color separation, a cross dichroic prism 34 for color synthesis, a total reflection mirror 38 for deflecting the optical path, and polarization separating prisms 35a to 35c. In FIG. 9, the zoom lens 310 is schematically illustrated. Further, an integrator is disposed between the light source 315 and the dichroic mirror 32, but illustration thereof is omitted in FIG. 9.

White light originating from the light source 315 is separated into rays with three colors (G light, B light, R light) through the dichroic mirrors 32 and 33. The separated rays with the respective colors respectively pass through the polarization separating prisms 35a to 35c, are incident into and modulated through the reflective display elements 31a to 31c respectively corresponding to the rays with the respective colors, are subjected to color synthesis through the cross dichroic prism 34, and are subsequently incident into the zoom lens 310. The zoom lens 310 projects an optical image, which is formed by the light modulated through the reflective display elements 31a to 31c, onto a screen 305.

Figure 10:
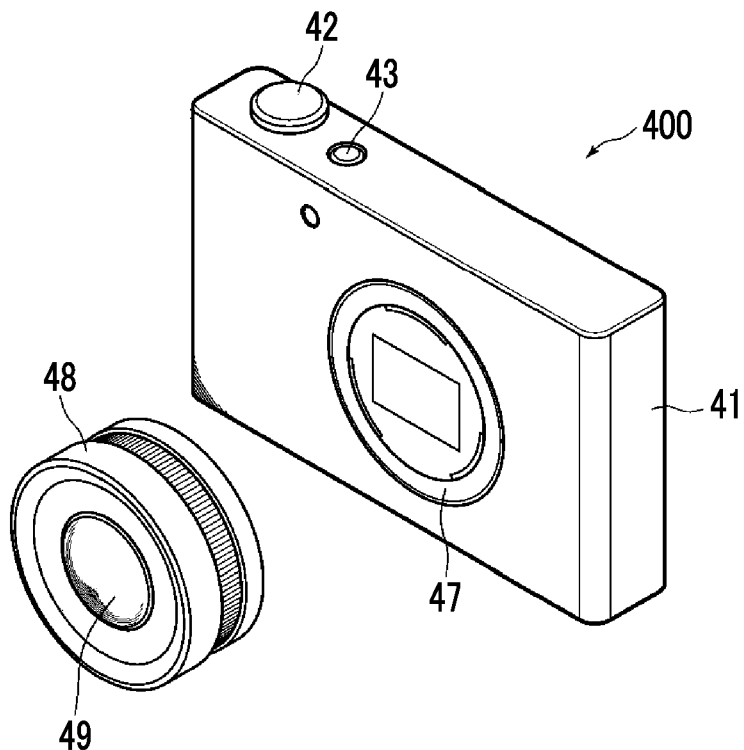
FIG. 10 is a perspective view of the front side of an imaging apparatus according to an embodiment of the present invention.
Figure 11:
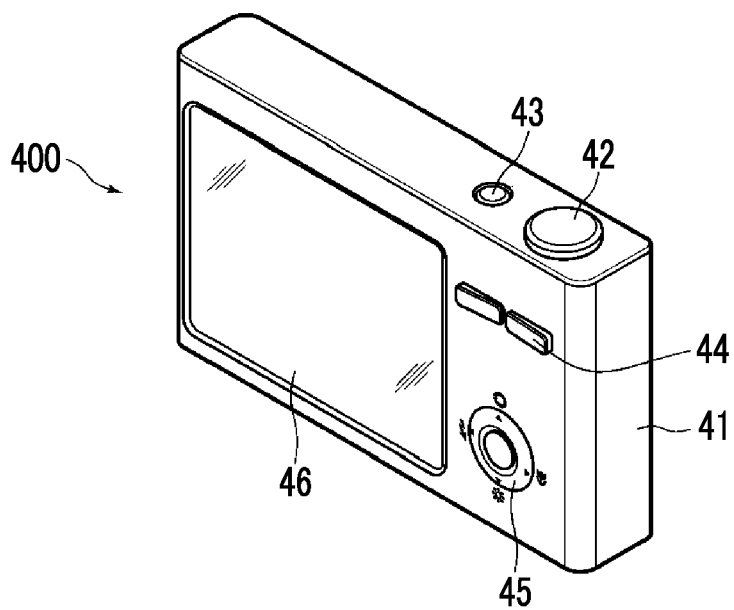
FIG. 11 is a perspective view of the rear side of the imaging apparatus shown in FIG. 10.

FIGS. 10 and 11 are external views of a camera 400 which is the imaging apparatus according to the embodiment of the present invention. FIG. 10 is a perspective view of the camera 400 viewed from the front side, and FIG. 11 is a perspective view of the camera 400 viewed from the rear side. The camera 400 is a single-lens digital camera on which an interchangeable lens 48 is detachably mounted and which has no reflex finder. The interchangeable lens 48 is configured such that a zoom lens 49 as the optical system according to the embodiment of the present invention is housed in a lens barrel.

The camera 400 comprises a camera body 41, and a shutter button 42 and a power button 43 are provided on an upper surface of the camera body 41. Further, operation sections 44 and 45 and a display section 46 are provided on a rear surface of the camera body 41. The display section 46 is for displaying a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown) such as a charge coupled device (CCD) outputs a captured image signal based on a subject image which is formed through the interchangeable lens 48. The signal processing circuit generates an image through processing of the captured image signal which is output from the imaging element. The recording medium records the generated image. The camera 400 captures a still image or a moving image by pressing the shutter button 42, and records image data, which is obtained through imaging, in the recording medium.

The present invention has been hitherto described through embodiments and examples, but the zoom lens of the present invention is not limited to the above-mentioned embodiments and examples, and may be modified into various forms. For example, the radius of curvature, the surface spacing, the refractive index, and the Abbe number of each lens may be appropriately changed.

Further, the projection display device of the present invention is not limited to that of the above-mentioned configuration. For example, the used light valve and the optical member used in separation or synthesis of rays are not limited to those of the above-mentioned configuration, and may be modified into various forms.

Further, the imaging apparatus of the present invention is also not limited to the above-mentioned configurations. For example, the present invention may be applied to a single-lens reflex camera, a film camera, a video camera, and the like.

EXPLANATION OF REFERENCES 10, 210, 310: zoom lens
11a to 11c: transmissive display element
12, 13, 32, 33: dichroic mirror
14, 34: cross dichroic prism
15, 215, 315: light source
16a to 16c: condenser lens
18a to 18c, 38: total reflection mirror
21a to 21c: DMD element
24a to 24c: TIR prism
25, 35a to 35c: polarization separating prism
31a to 31c: reflective display element
41: camera body
42: shutter button
43: power button
44, 45: operation section
46: display section 47: mount
48: interchangeable lens
49: zoom lens
100, 200, 300: projection display device
105, 205, 305: screen
400: camera
G1: first optical system
G11: first-1 lens group
G12: first-2 lens group
G2: second optical system
G21: second-1 lens group
G22: second-2 lens group
G23: second-3 lens group
L11a to L23a: lens
PP: optical member
Sim: image display surface
St: aperture stop
wa: on-axis rays
wb: rays with maximum angle of view
Z: optical axis

What is claimed is:

1. A zoom lens configured to form an intermediate image at a position conjugate to a reduction side imaging plane and configured to form the intermediate image again on a magnification side imaging plane, the zoom lens comprising:
a first optical system on the magnification side; and
a second optical system on the reduction side,
wherein the intermediate image is formed between the magnification side and the reduction side,
wherein the first optical system includes, in order from the magnification side, a first-1 lens group which has positive refractive power, and a first-2 lens group which has positive refractive power,
wherein the second optical system includes, in order from the magnification side, a second-1 lens group which has positive refractive power, a second-2 lens group which has positive refractive power, and a second-3 lens group which has positive refractive power,
wherein the first-2 lens group, the second-1 lens group, and the second-2 lens group are configured to be moved by changing spacings between the groups adjacent to each other in a direction of an optical axis during zooming, and
wherein the first-1 lens group and the second-3 lens group are configured to remain stationary with respect to the reduction side imaging plane during zooming.

2. The zoom lens according to claim 1,
wherein the following conditional expression (1) is satisfied, $$5 < f12/|fw| < 20 \qquad (1),$$

where f12 is a focal length of the first-2 lens group, and fw is a focal length of the whole system at a wide-angle end.

3. The zoom lens according to claim 1,
wherein the following conditional expression (2) is satisfied, $$5 < f22/|fw| < 12 \qquad (2),$$

where f22 is a focal length of the second-2 lens group, and fw is a focal length of the whole system at a wide-angle end.

4. The zoom lens according to claim 1,
wherein the following conditional expression (3) is satisfied, $$5 < f23/|fw| < 12 \qquad (3),$$

where f23 is a focal length of the second-3 lens group, and fw is a focal length of the whole system at a wide-angle end.

5. The zoom lens according to claim 1,
wherein during zooming from a wide-angle end to a telephoto end, the second-1 lens group is configured to move from the magnification side to the reduction side, and the second-2 lens group is configured to move from the reduction side to the magnification side.

6. The zoom lens according to claim 1,
wherein the following conditional expression (4) is satisfied, $$-25 < f211/|fw| < -2 \qquad (4),$$

where f211 is a focal length of a lens closest to the magnification side in the second-1 lens group, and fw is a focal length of the whole system at a wide-angle end.

7. The zoom lens according to claim 1,
wherein the lens closest to the magnification side in the second-1 lens group is a second-1-1 lens which has negative refractive power,
wherein a lens adjacent to the reduction side of the second-1-1 lens is a second-1-2 lens which has positive refractive power, and
wherein the following conditional expression (5) is satisfied, $$30 < v211 - v212 < 70 \qquad (5),$$

where v211 is an Abbe number of the second-1-1 lens on a basis of a d line, and
v212 is an Abbe number of the second-1-2 lens on the basis of the d line.

8. The zoom lens according to claim 1,
wherein the following conditional expression (6) is satisfied, $$2 < Bfw/|fw| \qquad (6),$$

where Bfw is a back focal length of the whole system as an air conversion length at a wide-angle end, and fw is a focal length of the whole system at the wide-angle end.

9. The zoom lens according to claim 2,
wherein the following conditional expression (1-1) is satisfied $$7 < f12/|fw| < 15 \qquad (1\text{-}1).$$

10. The zoom lens according to claim 3,
wherein the following conditional expression (2-1) is satisfied $$7 < f22/|fw| < 10 \qquad (2\text{-}1).$$

11. The zoom lens according to claim 4,
wherein the following conditional expression (3-1) is satisfied $$6.8 < f23/|fw| < 10 \qquad (3\text{-}1).$$

12. The zoom lens according to claim 6,
wherein the following conditional expression (4-1) is satisfied $$-20 < f211/|fw| < -3 \qquad (4\text{-}1).$$

13. The zoom lens according to claim 7,
wherein the following conditional expression (5-1) is satisfied $$34 < v211 - v212 < 60 \qquad (5\text{-}1).$$

14. The zoom lens according to claim 8,
wherein the following conditional expression (6-1) is satisfied $$3 < Bfw/|fw| < 10 \qquad (6\text{-}1).$$

15. A projection display device comprising:
a light source;
a light valve configured to receive light originating from the light source; and
the zoom lens according to claim 1, the zoom lens being configured to project an optical image onto a screen, the optical image being formed when light is modulated through the light valve.

16. An imaging apparatus comprising the zoom lens according to claim 1.

* * * * *